US008386338B2

(12) United States Patent
Farney

(10) Patent No.: US 8,386,338 B2
(45) Date of Patent: Feb. 26, 2013

(54) SYSTEMS AND METHODS FOR AUTOMATED GIFT DELIVERY

(75) Inventor: Bryan Farney, Georgetown, TX (US)

(73) Assignee: Web Two LLP, Georgetown, TX (US)

( * ) Notice: Subject to any disclaimer, the term of this patent is extended or adjusted under 35 U.S.C. 154(b) by 0 days.

(21) Appl. No.: 11/693,622

(22) Filed: Mar. 29, 2007

(65) Prior Publication Data

US 2008/0243630 A1 Oct. 2, 2008

(51) Int. Cl.
*G06Q 30/00* (2012.01)

(52) U.S. Cl. .................. 705/26.8; 705/26.7; 705/26.81; 705/26.82

(58) Field of Classification Search .................. 705/14, 705/26–27, 26.1–27.2
See application file for complete search history.

(56) References Cited

U.S. PATENT DOCUMENTS

| | | | | |
|---|---|---|---|---|
| 5,694,551 | A * | 12/1997 | Doyle et al. | 705/26 |
| 6,865,546 | B1 * | 3/2005 | Song | 705/26 |
| 7,130,820 | B2 | 10/2006 | Song | |
| 7,177,825 | B1 | 2/2007 | Borders et al. | |
| 7,496,518 | B1 | 2/2009 | Cayton et al. | |
| 7,580,861 | B1 * | 8/2009 | Song | 705/26 |
| 7,881,971 | B1 | 2/2011 | Nguyen et al. | |
| 2001/0042047 | A1 | 11/2001 | Nishida | |
| 2002/0040338 | A1 | 4/2002 | Sick et al. | |
| 2002/0077929 | A1 | 6/2002 | Knorr et al. | |
| 2002/0107757 | A1 * | 8/2002 | Evans et al. | 705/26 |
| 2002/0143664 | A1 * | 10/2002 | Webb | 705/27 |
| 2002/0178078 | A1 * | 11/2002 | OToole | 705/26 |
| 2003/0074253 | A1 | 4/2003 | Scheuring et al. | |
| 2003/0093388 | A1 | 5/2003 | Albright | |
| 2004/0019529 | A1 | 1/2004 | Broussard et al. | |
| 2006/0095338 | A1 | 5/2006 | Seidel | |
| 2006/0178946 | A1 | 8/2006 | Agarwal | |
| 2007/0143189 | A1 * | 6/2007 | Mitchem | 705/26 |
| 2011/0093360 | A1 | 4/2011 | Nguyen et al. | |

OTHER PUBLICATIONS

Lisa Henry and Ken Young, 1-800-FLOWERS.com to Acquire Cheryl & Co., A Leading Multi-Channel Retailer of Cookies and Other Baked Gifts, Mar. 11, 2005 (Westbury, NY).* www.bigdates.com. Jun. 29, 2006. [recovered from www.Archive.org].*

(Continued)

*Primary Examiner* — William Allen

(74) *Attorney, Agent, or Firm* — Schwegman Lundberg & Woessner, P.A.

(57) ABSTRACT

A system and method for automated selective gift delivery whereby a gift-giver is provided the opportunity to register as a user of the system and with respect to each desired recipient of one or more gifts for one or more events, typically recurring, to provide information to the system about the recipient and the events such that the system may select, or cause to be automatically selected, a gift suitable for the recipient and event based upon the parameters provided by the gift-giver, and cause the gift to be automatically delivered to the recipient without further action or intervention by the gift-giver. Alternative modes of the invention provide for various additional or alternative actions, including providing for: the sending of alternate gifts, which may be pre-selected or selected by the user; for declining to send a gift; and for sending non-recurring gifts.

4 Claims, 5 Drawing Sheets

OTHER PUBLICATIONS

"How Does It Work? Personalized Reminders for Birthdays, Anniversaries, Mother's Day", [online]. © 1997-2008 Barnes and Noble.com. [retrieved Apr. 10, 2008]. Retrieved from the Internet: <http://reminders.barnesandnoble.com/about/birthday_reminder_service.asp>, (stipulated to be prima facie prior art), 1 pg.

"How Does It Work? Personalized Reminders for Birthdays, Anniversaries, Mother's Day", [online]. © 1997-2008 Barnes and Noble.com. [retrieved Apr. 10, 2008]. Retrieved from the Internet: <http://reminders.barnesandnoble.com/about/birthday_reminder_service.asp>, (prior to Mar. 29, 2007), 1 pg.

"U.S. Appl. No. 12/978,334, Office Action mailed Feb. 15, 2011", 20 pgs.

"U.S. Appl. No. 12/978,334, Response filed Jun. 12, 2011 to Office Action mailed Feb. 15, 2011", 14 pgs.

"Shopnow.com Launches Gift Center and New Online Personal Shopper Assistants Across Shipnow Network", Business Wire, New York, (Nov. 17, 1999), 4 pgs.

* cited by examiner

SYSTEMS AND METHODS FOR AUTOMATED GIFT DELIVERY

BACKGROUND OF THE INVENTION

The present invention relates generally to systems and methods for providing automated delivery of gifts on behalf of a person or entity (either a "gift-giver" herein); and more specifically relates to systems and methods for receiving information on behalf of a potential gift-giver, and a potential gift recipient, and for enabling an at least partially automated method to initiate delivery of an appropriate gift at an appropriate time.

Giving and receiving gifts is a common practice in popular culture. Gifts are often given or received for birthdays, anniversaries, holidays, and other celebrations and events. While giving a gift may arise from a desire to please the recipient, or from a sense of obligation, or many other motivations, two common problems are faced by those who wish to give gifts. The first of these is remembering the dates and events for which one wants to give a gift. This problem is a common experience—forgetting to send a gift for a nephew's birthday, forgetting to send one's mother a gift for Mother's Day, and the like. A second problem faced by the gift-giver is choosing a gift that the recipient will like. Thus a grandmother may have no problem remembering her ten-year-old grandson's birthday, but will have great difficulty in determining what gift he might like to receive.

There are many known systems for keeping track of when gifts are due. These include older systems such as index cards for each day of the year that are sequentially rotated through the year so that as the card for a current event is removed from the front of the stack and placed at the back, the next card at the top of the stack will relate to the next event for which the gift-giver would like to remember to choose and send a gift to a recipient. Of course, many computer and web-based systems can also permit the entry of gift dates and send reminders in the form of email or similar messages. However, these systems do not provide for the choosing of a gift a particular recipient might like.

There are some known web-based businesses that will allow one to enter the age and gender of an intended recipient, and have the system provide one or more suggestions for a gift based upon what has proven popular for a person of that age and gender in that particular business. However, these systems do not automatically do so based upon an upcoming gift date. Further, they require the gift-giver to make a selection as to which gift to give, even if made from the recommendations provided by the business.

Finally, there is at least one web-based business which permits entry of dates on which a gift is to be given, and then automatically delivers the gift on or about the selected date with no further interaction by the user. However, this business is limited to flower delivery, and other than a pre-selection of the size of the flower arrangement, the business does not otherwise choose the gift, such as a particular flower arrangement, on the basis of age or gender. It makes no distinction, for instance, between the arrangement within the same chosen price range, in a flower arrangement sent to a 24-year-old girlfriend, and an 82-year-old grandmother.

A need therefore exists for a system and method whereby the date for a gift can be automatically remembered, and wherein an appropriate gift may be identified and delivered on or about the date of the event without action or intervention of the gift-giver. There is further a need for such a system which may accommodate circumstances in which one foreseeable criteria for an appropriate gift is the age or gender of the recipient, and wherein the system can facilitate delivery of a gift which is age and gender-appropriate.

SUMMARY OF THE INVENTION

As will be apparent from the discussion to follow, the system and method for automated gift delivery of the present invention may be implemented in any of a number of different embodiments, each of which will offer certain features, capabilities and/or advantages. For example, selected embodiments or implementations of the invention will permit entry of information about an intended recipient of a gift, including personal identifiable information such as name and delivery information, and other gift information such as gift type, gift price range, and will retain such information entered about an intended gift recipient and provide for selection of an appropriate gift for that recipient without intervention of the gift-giver. Automated delivery of the selected gift is also a preferable option. In many such implementations, the information regarding the gift recipient will be entered by or on behalf of the gift-giver. Additionally, in many such implementations the gift will be of a type, or intended for a recipient, such that the age and/or gender of the intended recipient may be a factor in gift selection. In such cases, many implementations of the invention will provide for receiving entry of information regarding the age and gender of the recipient, and the system will function to select a gift appropriate for the age and gender of the recipient. In certain implementations, the system will track the age of the recipient, such that gift selections may still be automatically selected in relation to the recipient's age as years pass.

Some implementations of the invention will preferably automatically select a gift, but will permit a gift-giver to intervene if desired, so that an alternative gift may be chosen. Such an alternative gift may be selected from one or more alternate gift suggestions, or in some cases may be selected by the gift-giver from a broader range of options. Similarly, where systems are configured to allow the gift-giver to intervene, one possible option for the gift-giver is to have the system not send a gift for that particular event to that particular recipient.

DETAILED DESCRIPTION OF PREFERRED EMBODIMENTS

In overview, the systems and methods of the present invention operate to provide an interface between an intended gift-giver and an intended gift recipient. In an overview of currently preferred examples, the system will accept information identifying the gift-giver and establishing a payment mechanism for gifts that are sent on behalf of the gift-giver. These gifts will be sent to identified recipients registered with the system to receive gifts for one or more certain gift events (as discussed in more detail later herein). In these currently preferred examples, the system will initiate the sending of an appropriate gift to the identified gift recipient, at a time on or close to the identified gift event date. These examples, as well as other possible variations on those methods will be discussed in more detail in relation to the Figures. It should be noted herein that "gift-giver," "user" and "client" are intended to have the same meaning and are used interchangeably throughout this application, depending upon the context of the discussion. In each case the "gift-giver may be a natural person or other entity. Additionally, in the Figures, for brevity, "gift-giver" is sometimes designated "GG".

Figure 1:
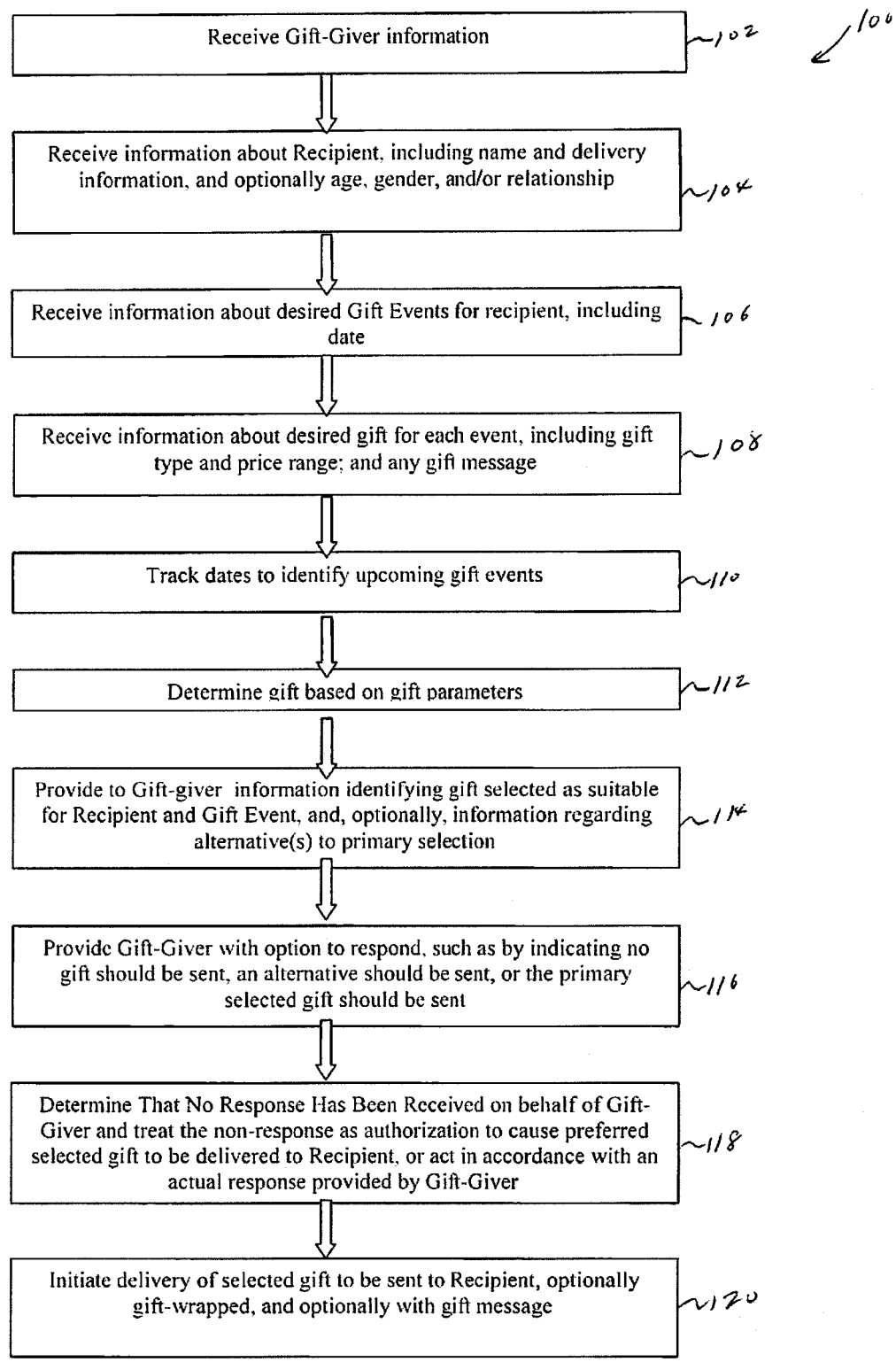
FIG. 1 depicts, in block diagram form, one illustrative system which may be implemented in accordance with the present invention.
Figure 2:
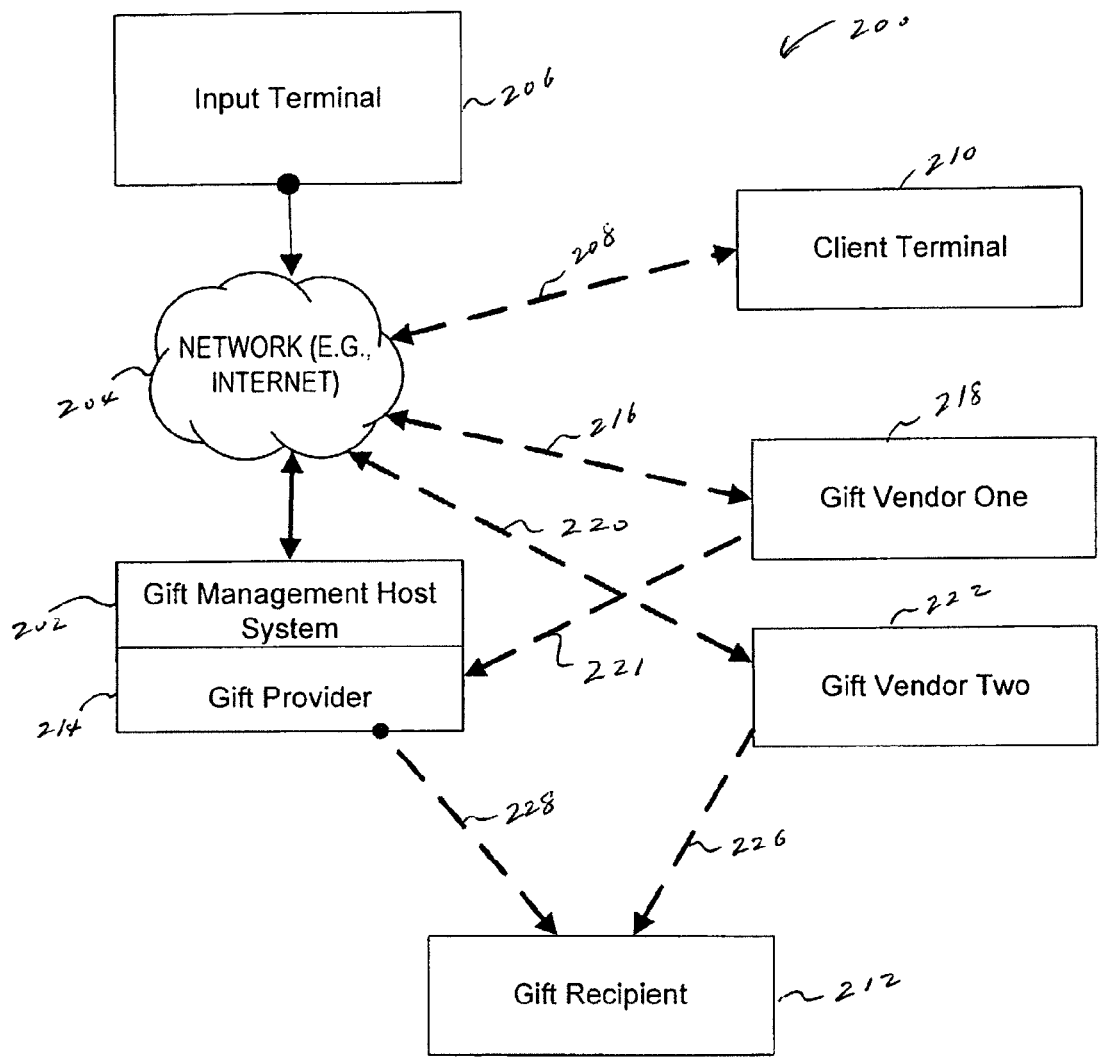
FIG. 2 depicts a flowchart illustrating steps as may be performed in accordance with one example of the present invention.

Referring now to FIG. 1, therein is depicted a flow chart of one example of a method of automated gift delivery 100, in accordance with the present invention. In some examples of the invention, a method such as this example will be performed, at least in large part, by a system as depicted in FIG. 2, and in such examples, many steps of the method will be performed by the gift management host system 202, as described relative to FIG. 2. As will be noted, in part, in the following description, and as will be apparent to those skilled in the technology, the described method 100 is merely one example method, and many modifications and variations may be used in accordance with the present invention.

To facilitate automated gift delivery, the intended gift-giver must be known to the system, at least as to some identifier and an appropriate mechanism for payment for gifts to be sent. Thus, the gift-giver will either register with the system, or if previously registered or otherwise known, will log-in to the system 102. In some cases, a user may already be known to a system. For example, if the gift-giver is, for example, a customer of an internet retailer that is providing the automatic gift delivery system, that retailer may already have all needed information about the gift-giver, and a simple conventional log-in to the provider's web site may provide all the needed information to the gift management host system (202 in FIG. 2). Where some type of registration is required for the gift management host system 202, that registration may occur at a time remote from the other steps herein, or may occur after some other steps in method 100 (such as the following step 108, for example).

Method 100 also includes receiving information about the gift recipient 104, and in presently preferred examples, will also include receiving information to aid in identification of an appropriate gift. Such information about the gift recipient will include at least that which is necessary to enable appropriate delivery of the gift. In many cases this will include at least the name and delivery address, and possibly a phone number, of the recipient. In some cases, where the gift is, or could be, of a type that could be delivered electronically, the information may include the email address of the gift recipient. However, as noted above, in many cases additional recipient information may be significant in enabling selection of an appropriate gift. Examples of such additional recipient information include the age and gender of the recipient. For example, in many cases, including as with children, the age and gender of the recipient will be significant. A gift appropriate for a two year-old girl would likely not be a gift welcomed by a sixteen year-old boy. Of course, in some cases, such as where the recipient is an adult, and the intended gift is of a type of relatively broader appeal, such as some type of food item, such as an assortment of cheeses, or a selection of wine, the age and/or gender may not be a significant factor in the gift selection, though other personal preferences of the recipient may be. An additional factor in gift selection may also be the relationship of the gift recipient to the gift-giver. One would anticipate that a gift appropriate for one's administrative assistant would not be the same as one might select for one's spouse, for example. Accordingly, in some preferred examples of the invention, the gift recipient information will include not only the described delivery information, but also at least one of the recipient's age, gender and relationship to the gift giver.

Additionally, information, or event parameters, will be received about one or more gift events for which a gift is to be sent 106 to the gift recipient. In some cases, such as for birthdays or anniversaries, etc., this information will include the date of the event. In the case of more well recognized events, such as religious holidays, Valentine's Day, etc., the system may optionally be configured to automatically supply those dates. In some cases, depending upon the category of gift selected, the gift event may be a more significant factor in gift selection than recipient information such as age or gender.

As will be apparent from the discussion above, several of the steps (such as for example, the preceding three steps 102, 104 and 106) involve the receiving of information. This may be accomplished through any appropriate mechanism. In some currently-envisioned examples of practicing the invention, a user interface will be supplied for entry of the information. In preferred examples, that user interface will supply an indication of the information needed. In some cases, as discussed relative to this step 106, that user interface might present a menu, such as a pull-down menu, with a list of certain events, from which a user might select events for which a gift should be sent. In such a case, if a selection is made indicating that a gift be sent for a well-known event, where the date is generally known, the user interface might supply that date automatically. Additionally, the user interface may optionally be configured to supply an alternative date for that event (such as where the gift recipient is known to always away from home on the date of the gift event). It should be understood that a "gift event" will be anytime that the sending of a gift is desired. For example, a user might register to send gifts to a spouse at essentially random times or intervals unrelated to a specific event, and each such time would be a "gift event," even if the exact date might be determined by the gift management host system 102.

In preferred examples of methods, information will also be received about the gift for each event 108. This gift information may vary between providers of automated gift delivery services, but will typically include a price range for each gift, or for example, for all gifts to a given recipient. Where available gift options are of several types, there may also be a selection between categories or genres from which gifts will be selected. One example of such a selection might be "flowers" for one gift event, but "jewelry" for another gift event, and "food items" for another gift event. The categories may be established between a virtually infinite number of possibilities within the discretion of the automated gift delivery service provider. For example, instead of the categories discussed above, the gift selection might be between gifts from a "flowers" category and a "living plants" category. Thus, the "category" may be any grouping from which the service provider will at least initially have the option to make the selection of one or more possible gifts. In addition to the gift information identifying the price range and type or category of the gift, the system may prompt the gift-giver to enter information indicating a choice to have the gift sent gift-wrapped, and/or of a message to be sent with the gift.

In some preferred examples, the gift information requested will be adjusted based on the recipient information entered. For example, where the recipient information includes that the gender is "female," and the relationship is "administrative assistant," different categories from which to select gifts would be identified to the gift-giver relative to the categories presented when the recipient information includes that the gender is "female," and the relationship is "spouse."

Once the above information has been received within the automated gift delivery system, the system will manage the gift events for all the users of that system, in accordance with their instructions. The system will track the dates of entered gift events 110, to determine gift events occurring within one or more date ranges, typically as established by the automated gift delivery service provider. When such gift events are identified, the gift parameter information will be evaluated to make gift selections 112. This gift parameter information will preferably include pertinent recipient information, as provided in step 104 above, as well as event information and gift information as received in steps 106 and 108, above.

In many examples of the method, this gift selection step will be performed entirely automatically, such as by gift management host system 202, based on gift item data provided to the system. However, other methods are possible, including some degree of human intervention, such as to make gift selections based on all or part of the gift parameter information, or to confirm or approve machine-made selections. Additionally, it is envisioned that in some examples of the invention, it may be useful to have the gift selection function performed by a separate processing system or another gift selection system, with or without some degree of human intervention. Such a separate gift selection system might be hosted and/or operated by the same entity or by a third party. In such an example, all or some portion of the gift parameter information may be communicated to such other gift selection system (which again may include human intervention, as previously described), for identification of one or more gift selections, with those results then communicated back to the gift management host system (202). These communications are preferably in electronic form, such as by email or the like. Such a third party gift selection system or other separate database may have information regarding all gift types and gift ranges, or instead may be more specialized by gift category and/or price range and be selected by the system of the invention to perform gift selection only for gifts within that relevant category and/or price range.

The automated gift selection may operate in several ways. The system of the invention may have its own database of gift options, and may choose from among them based upon the gift information submitted by the gift-giver, and then based upon what the system's database has stored as information helpful in determining which among the gifts satisfying that gift information would be most popular among recipients of the age, gender, and, optionally, relationship of the intended recipient, and any other gift parameter information. In one presently preferred embodiment, the system selectively chooses among several human-based gift selection systems based upon the gift-type and price-range pre-selected by the gift-giver. The chosen human-based gift selection system is provided with gift parameter information, including gift type, price range, and recipient age, gender and, optionally, relationship, from which a gift is then chosen to accommodate the other gift parameters identified by the gift-giver.

An optional step is presented at step 114, where alternative gift selections will also be made. In preferred examples of the method, one gift selection will be identified by the system as the default selection, which will be sent in the absence of any further or contrary instructions from the service client. However, alternative gift selections as made in this step may also be presented to the gift-giver as alternative gifts, in case the gift-giver elects to intervene. Additionally, in preferred examples not only will the default gift selection be made in reference to the recipient information and other gift parameter information, but at least one alternative gift selection out of one or more alternative selections will also be made in reference to the recipient information and other gift parameter information.

Another optional step is presented at step 116, where the default gift option, as well as any identified alternative selections are communicated, preferably electronically, to the client. In this case, the client will be given the opportunity to provide optional directions regarding the sending of a gift. These optional directions may be determined by the gift delivery service provider. But in preferred examples, the optional directions include: indicating that no gift should be sent, selecting an alternative gift, confirming instructions to send the default gift, and/or confirming or changing the delivery instructions.

In preferred examples of the method where step 116 is performed, the system will then perform step 118, to determine if no response has been received, and thus will initiate delivery events as to the default gift selection in accordance with step 120. Alternatively, in the event a response with optional directions was received, the system will process the optional directions, and unless the optional instructions were to not send a gift, will initiate delivery events of a gift in accordance with those instructions in step 120. As will be apparent from the discussion to follow, the initiation of delivery events may vary depending upon the business structure and procedures of the automated gift delivery service provider. The initiation of delivery events is intended to embrace whatever acts are required from the automated gift delivery service provider to cause the appropriate gift item to be forwarded, in accordance with the client's instructions, by whatever method and/or instrumentality is appropriate, to the gift recipient.

Figure 5:
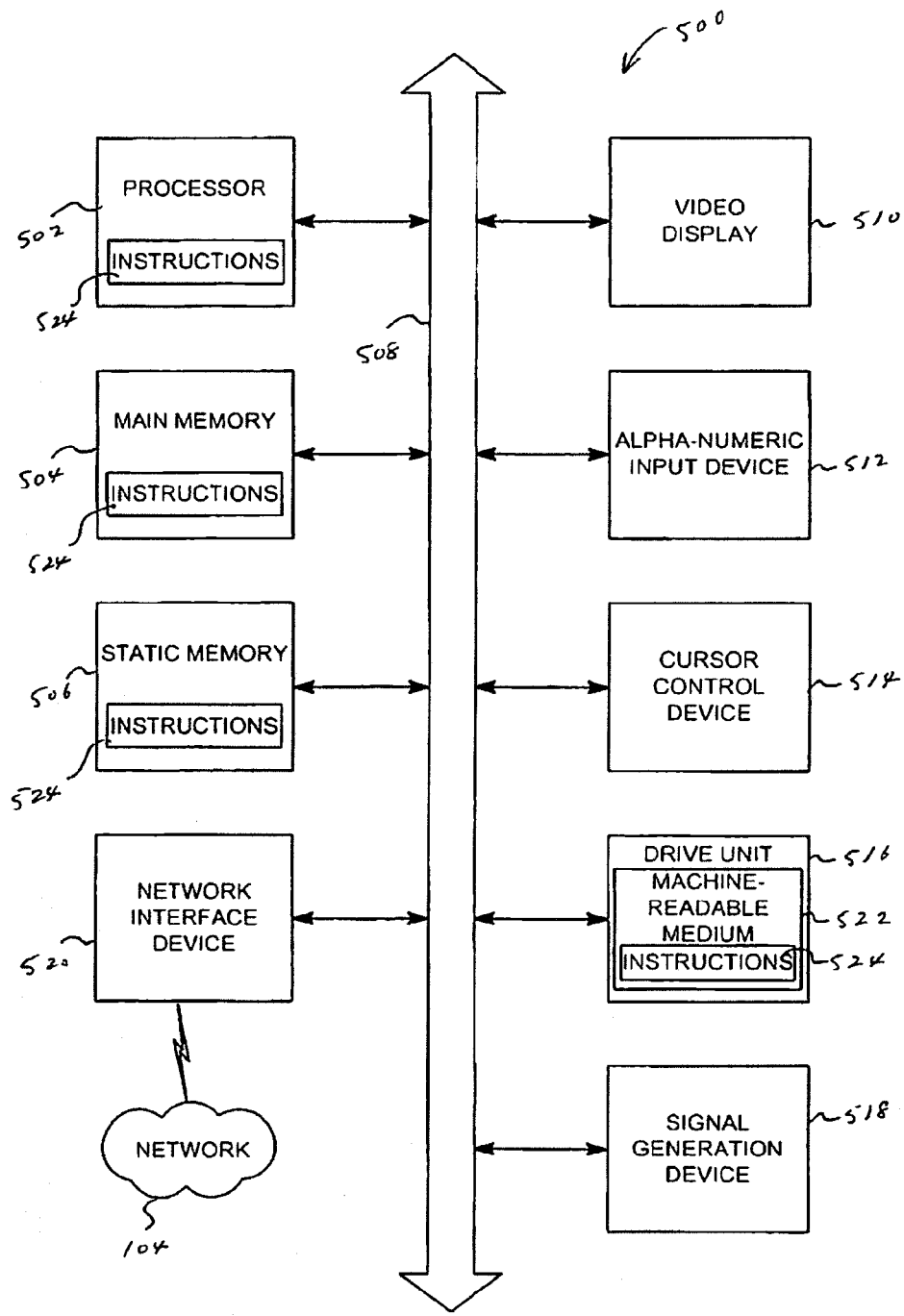
FIG. 5 depicts, in schematic form, a processing system as described for use in accordance with the present invention.

FIG. 2 depicts an example of one possible system in accordance with the present invention and useful to implement one or more of the methods as described herein, At the heart of gift delivery system 200, is gift management host system 202. In currently preferred examples of the invention, gift management host system 202 will include a processing system. For the purposes of this specification, a "processing system" includes a system using one or more processors, microcontrollers and/or digital signal processors having the capability of running a "program", which is a set of executable machine code. Thus such processing systems include computers, or "computing devices" of all forms (desktops, laptops, palmtops, servers, etc.). A "program" as used herein, includes user-level applications as well as system-directed applications or daemons. The processing system of gift management host system 202 will have the capability to receive, process and store data as described herein. An example processing system useful to implement one or more steps of the described invention is depicted in FIG. 5, and discussed in reference thereto.

Gift management host system 202 communicates with additional nodes or devices through one or more networks 204. In many currently preferred examples, the networks 204 will include the internet, but may also include (in addition, or instead in some examples) other networks, such as a local area network (LAN) or wide area network (WAN).

Through such a network 204, gift management host system 202 will communicate with one or more input terminals 206 through which information regarding a gift-giver, a gift recipient or a gift event (each as addressed in more detail later herein) may be input and communicated to gift management host system 202. In many currently preferred examples of the invention, all or part of such information will be entered over the internet, and in such cases the input terminal 206 will be a user's computer or other processing system (including all forms of computers as addressed herein, as well as various well-known communication and electronic devices such as cell phones, music players, and PDA's capable of communicating over a network). In such examples, the interface will preferably be a conventional web page interface hosted either by gift management host system 202, or by another processing system in communication with gift management host system 202. However, it is also possible that an input terminal might include a screen and input device, such as a keyboard, either coupled directly to gift management host system 202, or to a processing system in communication with gift management host system 202. For example, in the instance wherein the gift management system of the present invention were to be implemented by a conventional "brick and mortar" retailer, that retailer might have a terminal in the store where the needed information could be input. That input terminal 206 could interface essentially directly with gift management host system 202, or with a computer or other processing system in at least selective communication with gift management host system 202. As an example of another such use, a vendor (either brick and mortar, or not) might provide a telephone call-in system where information could be input on behalf of a user by a call operator through a mechanism local to gift management host system 202.

Additionally, although not essential to the system, in many examples, gift management host system 202 will also be able to communicate 208 with a user through a client terminal 210. Such a "client terminal" is not intended to imply a specific device, but may be any processing system or other mechanism by which a client might receive an electronic communication, for example, an email or short-message-service (SMS) communication, regarding a gift recipient and/or event. Also, as is thus readily apparent, gift management host system 202 might communicate with a given client through multiple client terminals 210, wherever the client might receive such an electronic communication from time to time. Of course, as noted above, such client terminal 210 may also be the input terminal 206. The depiction of these terminals as separate elements is merely to enable a clearer description of the different ways in which gift delivery system 100 may be implemented, rather than to indicate a requirement of even this example system.

Gift delivery system 200 may be configured in a variety of ways to facilitate the actual delivery of a gift to the gift recipient 212. Three such examples will be described in reference to FIG. 1, but it should be clearly understood that these are non-exclusive examples; that is, any one or more of the three described mechanisms and relationships might be used in any specific implementation of the invention, or another system may be implemented for facilitating actual delivery of a gift in accordance with the present invention.

As a first example, as depicted by the shared box by the gift management host system 202 and the gift provider 214, the entity offering the services to users provided through gift management host system 202, may also be the provider (i.e., the "gift provider") 214 of the gifts selected on the basis of all or part of the gift parameter information provided. As one example, a retailer might host the described system as implemented by gift management host system 202, and also be the entity that supplies some or all of the gift items (i.e., is "gift provider" 214) to the recipient. In such case, once a gift is identified to be sent, as previously described, the gift provider would obtain the item to be supplied in a conventional manner, such as from inventory; and in such a case the initiating of delivery events would include shipping or otherwise transmitting the gift 228 to the recipient 212, either directly or through an agent, such as a packing and/or shipping service.

In the second and third examples, the provider of gift management host system 202 may have one or more entities with which it cooperates to accomplish the intended gift delivery. As an example, in the case of gift vendor one 218, upon determination that an identified gift is to be sent, an electronic communication 216 may be sent from gift management host system 202 to gift vendor one 218, instructing that the gift item be forwarded 221 (by either shipping or transmitting) to gift provider 214, and gift provider 214 will then initiate forwarding 228 of the item to the gift recipient 212 (again, either directly or through an agent).

As a different example, gift provider 214, upon a determination that a gift is to be sent, may send an electronic communication 220 to gift vendor two 222. Gift vendor two 222 is then under instruction (either from the communication, or by prior or separate agreement) to forward 226 the identified gift directly to gift recipient 212 for appropriate delivery.

Figure 3:
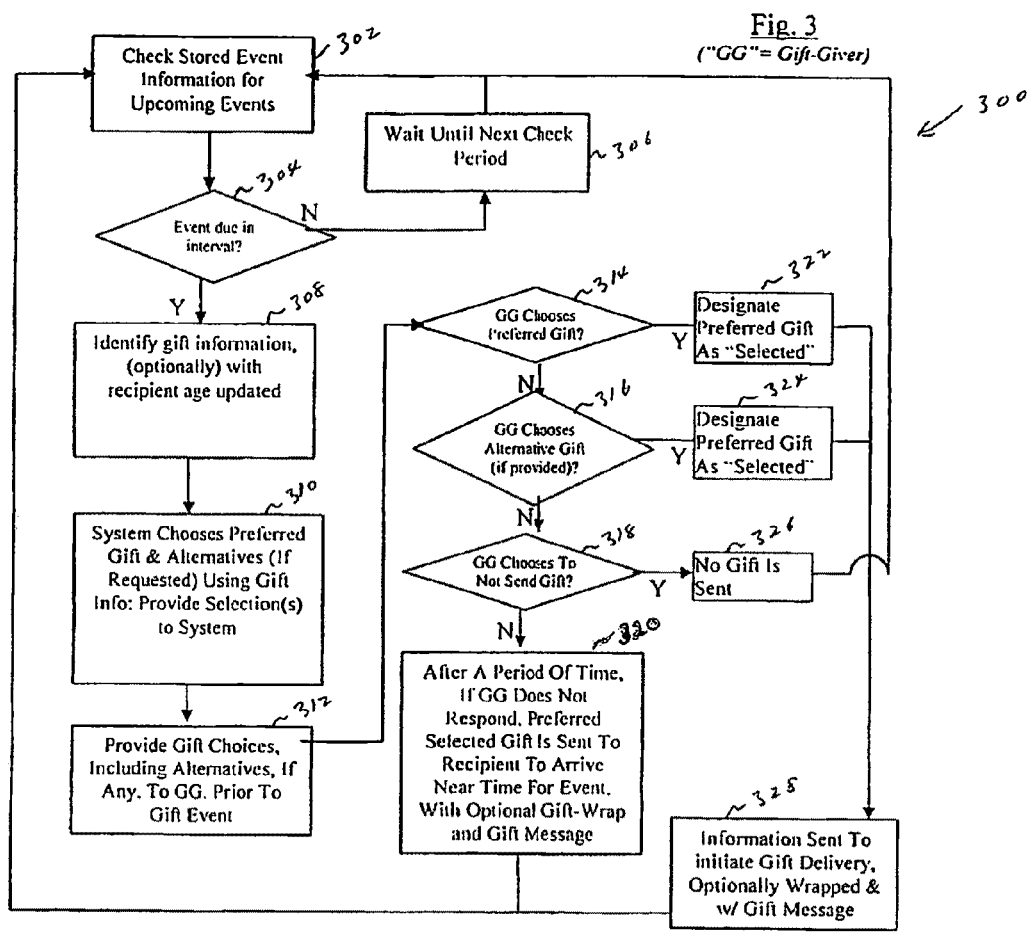
FIG. 3 is a flowchart depicting an example of a method for implementing a portion of the steps of the method of FIG. 1 in greater detail.

Referring now to FIG. 3, therein is depicted a more detailed flow chart of an example method 300 for implementing the acts of steps 110 to 120 of example automated gift delivery method 100, as described relative to FIG. 1. As previously described, the system checks stored event information 302 to determine 304 if any gift events are in a determined period into the future. As noted previously, this timing may be any one or more intervals selected by the service provider. The appropriate interval may vary significantly between service providers. However, in many examples, it is preferred that the interval for delivery be a few weeks, in order to give time for the other steps of the invention to be carried out. If the determination is made that no gift event is within the interval, the system waits until the next determined check interval 306, for example, the next day, to return to step 302 for future events. This pattern repeats.

If a gift event is determined to be within the pre-determined time in the future, the system identifies the recipient information and other gift parameter information to be used in selecting a gift for that event 308. Where the age of the gift recipient was entered (see step 104 of FIG. 1), the system preferably provides for the annual updating of the age of the recipient as appropriate. Such preferred examples of the invention can therefore permit the entry of gift information regarding a recipient and event, such as birthday, and then have a gift delivered to that recipient every year on the recipient's birthday, with the gift being age-appropriate, indefinitely, without any further intervention by the gift-giver.

In step 310 the system selects, or causes to be selected, a gift for the particular recipient and event that is based upon and intended to accommodate the recipient, gift and event parameters provided by the gift-giver. As noted relative to step 114 in FIG. 1, it is also within the contemplation of the preferred embodiment that one or more alternative gifts may be selected based upon some or all of the same information.

Once the default and any alternative gift selections are made, the information is preferably provided to the gift-giver 312. As noted previously, this will preferably be done electronically, under the automatic control of the gift management host system 202. The communication of this information may be at any desired time. However, a time that is both generally proximate the event, but which gives adequate time for the gift-giver to respond, while still facilitating gift delivery is appropriate. For example, for many examples of systems and services, approximately 14 days prior to the gift event may be satisfactory.

The information provided the gift-giver in step 312 regarding the selected primary gift, and any alternative gifts, can be in the form of text description, pictures, or any other identifying information. Event information and recipient information is also preferably provided to the gift-giver in this communication. Optionally, the gift-giver can be provided information about the cost of the selected gift, and any alternative gift choices, and the cost for delivery of the gift, including taxes shipping charges and/or other fees. In the event that the gift-giver wishes to respond to the electronic communication of step 312, then one or more of several determinations are possible. A first possible determination 314, is as to whether the gift-giver chooses the selected gift as the one to be sent. If that is determined in the affirmative, then that gift will be resolved as the selected gift 322, and processing will continue accordingly. In the event that determination is in the negative, then a second possible determination 316 is as to whether the gift-giver chooses an alternative gift selection. If that determination is resolved in the affirmative, then the selected alternative gift will be resolved as the selected gift 324, and processing will continue accordingly. And if that determination is resolved in the negative, then a determination will be made as to whether the gift-giver has chosen not to send a gift 318, in which case, no gift will be sent 326. If, after some appropriate determined period of time, by way of example only, two days, the gift-giver does not respond, then in at least the most preferred examples of the invention, the originally-selected gift will be sent to the gift recipient 320. This default action assures that the gift-giver will never be embarrassed by the failure to send a gift at the appropriate time.

Once processing reaches step 328, by whatever path, the system will initiate the sending of a gift, as described elsewhere herein. Such gift will preferably be sent with any gift wrap and/or greeting to the extent that any such selection or information was previously input by the gift-giver.

It will be apparent that many modifications may be made to the example method depicted in the flow chart of FIG. 3. For example, an option also within the contemplation of this invention is for the gift-giver to be additionally provided with an option following step 312, to permit the gift-giver to review a larger range of inventory generally satisfying the gift parameters for the particular event and recipient. In this mode, the gift-giver would then have the option of choosing a gift for the recipient and event from the entire relevant inventory, rather than only the primary and any alternative selections identified to the gift-giver as part of step 312. If such a gift were selected, it would be designated by the system as the selected gift for that event and recipient, and the system would then proceed as set forth in step 328.

It is also within this contemplation of this invention to provide for a mechanism whereby a gift-giver entering an event, whether recurring or one-time, which requires delivery in less than the usual time period, will be provided an accelerated schedule for the remaining steps of FIG. 3 as desired. The system may also optionally provide for notice to the gift-giver that gifts cannot be provided for events first identified to the system closer than a pre-defined period of time, such as two weeks.

Figure 4:
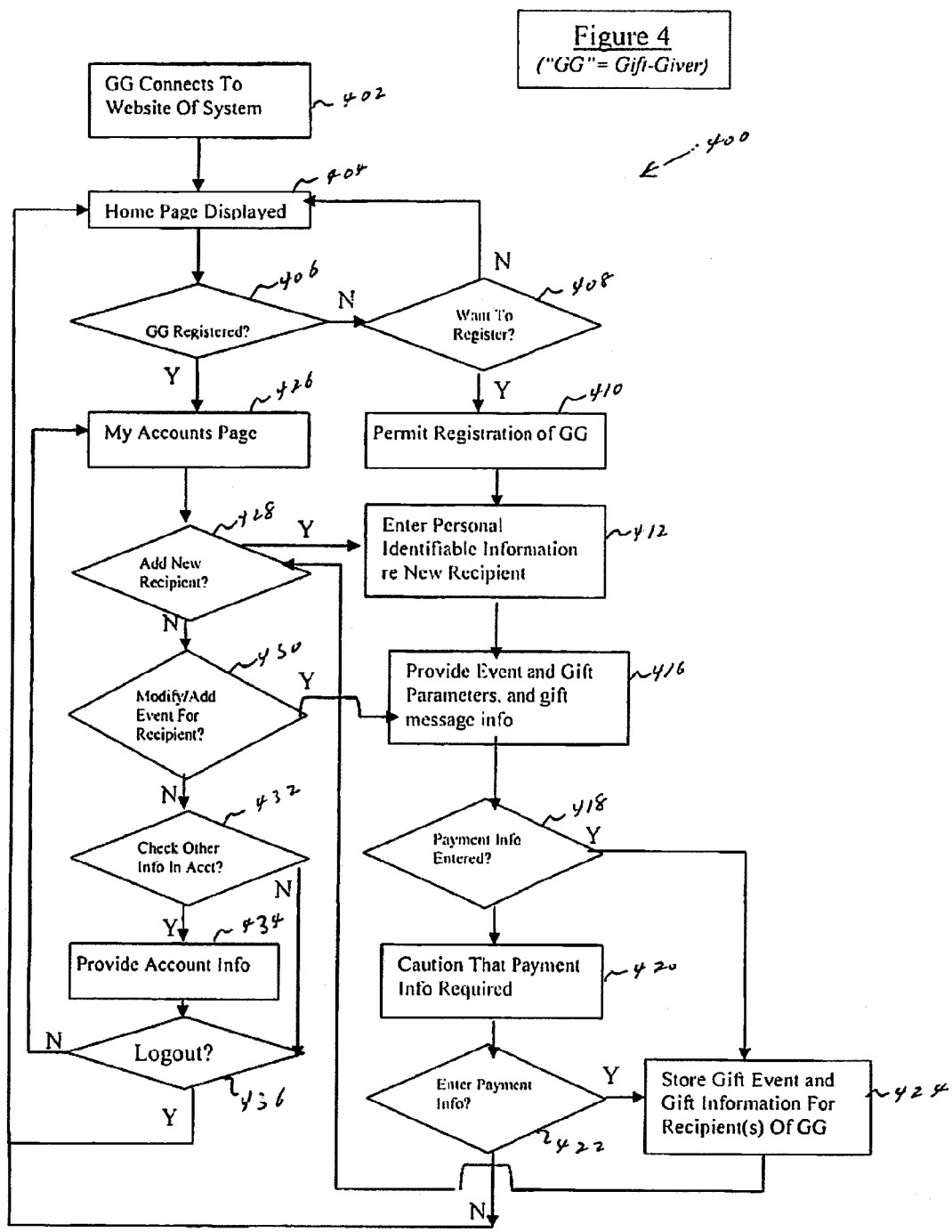
FIG. 4 is a flowchart depicting an example of a system of a system for registering a user and gift parameters in accordance with the present invention.

Referring now to FIG. 4, as noted previously, in some cases a user will be known to the automated gift delivery service provider and the system. However, in some cases, the user may need to register and to input gift recipient, gift event and other gift parameter information. FIG. 4 depicts a flow chart of one example method for registering a user, receiving gift parameter information, and facilitating that user's continued interaction with the system.

As noted previously, in some preferred examples of the invention, an interface to the system will be provided by a web page user interface, hosted by or on behalf of the automated gift delivery service provider. The example of FIG. 4 depicts operation of such a system, where the interaction is initiated by the user connecting to the system, such as through such a website 402. However, the method of 402 may also be implemented through alternative interfaces, as discussed earlier herein. When a user connects to the website, a home page will be displayed 404, providing a number of further options to the user.

One of these options will be to make a determination 406 as to whether the user, the potential gift-giver, is registered or otherwise known to the system. This is one of several options that will likely be displayed to a user. In many examples, the user will have the ability to navigate through a portion of the website to learn more about the gifts and the services available. But in order to obtain the automated gift delivery services, the user will typically need to be known to the system in an appropriate way. Assuming that a user is determined to not be known 406 to the system, a decision will be made if the user wishes to register 408. This may be done, for example, by a direct question to the user, or may be inferred from choices made or actions taken by the user at the website.

If that determination is affirmative, then the user will be provided with an interface, which may include one or more data input screens, identifying the necessary information required by the system, thus allowing the gift-giver to register 410. As noted previously, this user information may vary depending upon the needs and requirements of the automated gift delivery service provider. However, in most examples, the necessary user information will include at least a user's name; contact information, such as at least an email address; and payment information, such as a credit card to be charged and additional associated information sufficient to allow the processing of charges to that credit card. Many other types of information might also be obtained, such as a user name and/or a password (typically of the user's selection).

After such registration, the user may make use of the automated gift delivery services, by entering information identifying a new gift recipient 412. It should be understood that there may be a substantial period of time between the registration of a new user 410 and the entry of information regarding a gift recipient 412. Thus a gift recipient may be identified on a subsequent visit and log-in to the site, as will be discussed relative to step 426 and the steps that follow it.

Information about the recipient that would be requested would include shipping information, and personal identifying information, such as a name and possibly an email address. In preferred examples of the invention, at least where the age or gender of the recipient, or the relationship of the recipient to the gift-giver, is a factor, or is perceived by the gift-giver to be a factor, for selection of an appropriate gift, the gift-giver may also be provided with an interface through which the system will receive such information. For example, the gift-giver may be asked to provide the recipient's birth date, including birth year, of the recipient, and gender. Additionally, the system can also request the relationship of the recipient to the gift-giver, such as spouse, son, daughter, friend, and the like. The age, gender, and relationship of the recipient, are optional, but preferred options as gift information used to select a gift for a recipient, and may be considered to be referred to herein as part of the personal identifiable information for the recipient, or as part of the gift information, or both, as appropriate.

Upon receipt of this recipient information, the system would then provide the gift-giver with an interface to receive information regarding a number of possible gift-related choices 416. One example of such gift-related information is the event for which the gift-giver wishes to have a gift selected and delivered, such as the recipient's birthday, an anniversary, and/or special holidays, such as Valentine's Day and Christmas. In some examples, the gift-giver will have the ability to add events. While the focus of the system is for use for gift-giving in association with recurring events, it is also within the system of the present invention to additionally provide for the selection and delivering of non-recurring special events, such as a wedding or graduation. It should also be understood that the term "gift event" as used herein applies to any date or time that a client wishes to have a gift delivered. For example, a client might wish to have gifts delivered at regular or random times, without regard to a specific external event.

The gift-giver is also preferably provided at step 416 with a selection of gift categories, which may be pre-screened as appropriate or desirable for the recipient's age, gender, and even relationship to the gift-giver. The gift-giver can then choose among these preferred gift types. Optionally, the system can simply select a gift type without further intervention of the gift-giver, based upon information provided by the gift-giver, such as age, gender and relationship. Also as an option, the gift-giver might be provided the opportunity to ask to see more gift types, if the first one(s) preferred were not desirable or the gift-giver simply wanted to understand what other gift-type choices might be available.

The gift-giver is also preferably provided with a preferred price range for the gift for the recipient for the particular event. This price range selection can be made before or after the selection of gift-type, but preferably after gift-type selection, and the prices ranges presented may vary based upon the gift types selected.

In connection with both the gift type selection and/or the gift price range selection, one option associated with step 416 would be to provide the gift-giver more information about gifts that might be given in that type and/or price range, either by additional text information, graphic information, or photos or audio or visual images. Information could be provided in the form of descriptions or pictures of example gifts within a category and/or a price range.

In the preferred embodiment, the gift-giver is also provided with the option in association with step 416 of providing text for a greeting or message to be provided with the delivery of the gift. Suggested text may be provided, which can optionally be edited by the gift-giver. Alternatively, an entry means may simply be provided with no advance suggestion, in which the gift-giver may provide a preferred message. The gift-giver can then repeat these choices and information entries for additional events as desired.

The method will also include prompting the gift-giver to supply payment information, and will be prompted to do so during the information entry process. In the event such information is not entered, preferred examples of the system will make that determination 418, and caution the user that such information is required 420. A determination will be made 422 if the information has been entered, and if all necessary information is entered, the method will proceed to step 424 where the information will be stored. The system will then track gift events as described relative to FIG. 1.

This user information or the payment information, may be requested as a first, intermediate, or last step in the entry process. Thus, the steps depicted in FIG. 4 are just an example of one possible order for such steps to occur. The system may request this information at initial sign-in or registration, after the first complete entry of gift-information for a particular event of one recipient, after complete entries of gift-information for all desired gift events for a particular recipient, or at some different point in the entry of information regarding multiple recipients. Typically, the system would not act to choose, select, or deliver a gift until payment information or payment has been provided. Payment may be taken in the form of a credit card, other form of electronic payment, or less preferably, and optionally, more traditional forms of payment, such as cash or check. Optionally, credit may be provided by the system, in the form of payment credits, delayed billing, promotional credits or other incentives which may be used by a gift-giver. Optionally, discounted or free access might be provided, for example, to charities or as rewards.

Referring back to decision block 406, it may be determined that a user is already registered. In that circumstance, the gift-giver who is already registered may log-in to the system and then be presented with a "My Accounts," or a similar page 426. From the My Accounts page 426, determinations can be made in response to user inputs of what steps the user may wish to take. For example, a decision may be made 428 if the gift-giver wishes to add a recipient 428, modify or add an event for a recipient 430, or review other account-related information 432. Similarly, the user may be given an opportunity to update account information 434, and subsequently to log-out of the system 436.

As will be apparent to those skilled in the technology, other options (not depicted) may be presented to the gift-giver. For example, the gift-giver may be provided the option of cancelling the entire account, thereby cancelling all event and recipient information. Also not shown, the gift-giver may be provided the option to suspend the account, so that during the period of suspension, no gift is sent that would otherwise be due based upon the gift-giver's account. The gift-giver would then be provided the option to remove the suspension and re-activate the account, at which point the system would proceed from that date forward as elsewhere described with respect to the gift-giver's recipients and gift events.

In the event that the gift-giver chooses to add a new recipient at step 428, then the gift-giver will be asked to provide the personal identifiable information, event information, and gift parameter information regarding the new recipient as generally reflected in steps 412 and 416. If the gift-giver chooses to modify the account to change certain information regarding a recipient or event or gift, that would be done by modifying the information previously provided, as in step 410, and then would be saved as updated information 424. If the gift-giver chooses to check other information regarding the account as generally reflected at step 434, the request can be made and information can be provided to the gift-giver by the system regarding information regarding the gift-giver's recipients, events, gift selections, usage of the system, number of gifts that have been sent in a particular time period, amount that has been spent in a particular time period, and the like. The system can preferably also retain the history of each gift sent on the gift-giver's behalf, including associated event and recipient information, and costs, and provide this history to the gift-giver 434.

Also, while not shown, the system can preferably provide for a means, such as email or other electronic communication, for the gift-giver to communicate, such as to ask questions and the like, with an operator of the system. This means may be provided at step 404 or 426, and elsewhere in the system if desired. Additionally, standard and known ways are provided to permit a user who forgets the log-in name or password to be assigned new log-in name or password, or to be reminded of that information.

Once the system has information regarding the gift type and price range choices for a gift intended for a particular event for a particular recipient, as reflected generally in step 424, it then proceeds to the automated gift selection and delivery portion of the method and system of the present invention, as described in reference to FIG. 1.

Referring now to FIG. 5, therein is depicted in block diagram form, an example of a processing system 500 within which a set of instructions, for causing the machine to perform any of the functionality discussed herein, may be executed. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify operations to be taken by that machine. Further, while only a single machine is illustrated, the term "machine" shall also be taken to include any collection of machines that individually or jointly execute a set (or multiple sets) of instructions to perform any one or more of the steps or more complex operations discussed herein.

The example processing system 500 includes a processor 502 (e.g., a central processing unit (CPU) a graphics processing unit (GPU) or both), a main memory 504 and a static memory 506, which communicate with each other via a bus 508. The processing system 500 may further include a video display unit 510 (e.g., a liquid crystal display (LCD) or a cathode ray tube (CRT)). The processing system 500 also preferably includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by processing system 500, the main memory 504 and the processor 502 also constituting machine-readable media.

The software 524 may further be transmitted or received over a network 104 via the network interface device 520. It should be readily understood that the above elements of a processing system may not be found in all examples of processing systems that may be used in performing steps of the present invention. By way of example only, it is not essential that every processing system have a disk drive, so long as it has a memory or other means to store and/or access a store of machine-readable instructions for performing desired operations. And of course, operations which may be performed in software, might also be performed through hardware or firmware implementations.

As is apparent from the discussion herein, many modifications and variations may be made from the specific examples of systems and methods for automated gift delivery as described and illustrated herein without departing from the spirit and scope of the present invention. Accordingly, the scope of the present invention is defined by the following claims, and by all equivalents thereof.

I claim:

1. A method of providing gift-providing services for a recurring event, comprising the acts of:
    receiving electronic data communication of gift event information at a computer, the information comprising information regarding events for which a gift is to be provided, said information including a date of each event;
    identifying the interval of recurrence of the event;
    receiving an electronic data communication of information regarding the gift recipient, including the delivery address of the gift recipient;
    receiving at a computer an electronic data communication of information regarding the gift to be sent, said information comprising for each said gift, a gift type to be delivered, said gift type selected from a plurality of possible gift categories;
    receiving electronic data communication of information regarding the gift giver, said information comprising a payment method for the gifts;
    in advance of the gift event, electronically transmitting a proposed gift selection to the gift giver, said gift selection identifying a date by which the selected gift will be sent to the gift recipient in the absence of any further instruction from the gift-giver; and
    in the absence of any further instruction from the gift-giver, arranging for delivery of a gift to the gift recipient in accordance with said proposed gift selection, wherein the arranging comprises sending an electronic communication to a selected gift vendor of a plurality of gift vendors, the selected gift vendor being a vendor of the proposed gift selection, the communication instructing for the proposed gift to be sent by the selected gift vendor to a service provider for delivery to the gift recipient; and
    receiving, by the service provider, the proposed gift and sending the received proposed gift to the gift recipient.

2. A method of managing sending of gifts by a gift provider for recurring gift events for a client, comprising the acts of:
    providing an electronic interface configured to received information from the client;
    through said interface, receiving information at a computer, the information identifying,
        at least one recipient for a recurring gift,
        at least one recurring gift event for said gift recipient and the date of said event,
        at least one selection criteria for the gift to be sent to said gift recipient, wherein the selection criteria comprises at least one of a gift price range and a gift type selected from a plurality of gift types, and
        payment instructions for the gifts;
    in advance of the gift event, using a computer to electronically transmit to the client a reminder of the gift event and gift recipient including a first gift selection which will be forwarded to the gift recipient proximate the gift event date in the absence of any further instruction from the client, said first gift selection made in reference to said at least one selection criteria; and
    in the absence of any further instruction from the client, initiating delivery of the first gift selection to the gill recipient proximate the gift event date, wherein initiating delivery of the first gift selection comprises the gift provider sending an electronic communication to a vendor of the first gift selection, in response to which the gift vendor forwards the first gift selection to the gift provider for forwarding to the gift recipient.

3. The method of claim 2, wherein the reminder electronically forwarded to the client comprises an indication of at least a first alternative gift selection.

4. A method of operating a system for managing sending of gifts for recurring events by a gift provider on behalf of a plurality of clients, comprising the acts of:
- providing an electronic interface configured to receive information on behalf of the clients, said interface establishing at least selective communication with a network;
- through said electronic interface, receiving client registration information at a computer, said client registration information sufficient to,
  - identify the client,
  - identify a method to communicate with the client electronically, and
  - establish a payment mechanism for services provided on behalf of the client;
- through said electronic interface, receiving gift registration information at a computer, the gift registration information identifying, for at least a portion of said clients,
  - at least one recipient for a recurring gift,
  - at least one recurring gift event for said gift recipient and the date of said event,
  - and
  - at least one selection criteria for the gift to be sent to said gift recipient, said electronic interface facilitating selection of a gift type, from a plurality of gift types;
- maintaining a computer-readable data store of said received client registration information and gift registration information;
- periodically accessing said computer-readable data store to identify gift events within a selected time interval, and identifying at least a first gift event within the selected time;
- in response to said identified first gift event, identifying a first gift selection in accordance with said at least one selection criteria;
- electronically communicating a reminder of the gift event and an identification of said first gift selection to the client;
- providing an interface through which said client may submit a further instruction regarding delivery of a gift for said gift event;
- in the absence of receipt of any further instruction on behalf of said client, sending an electronic communication to a vendor of the first gift to initiate transmittal of said first gift selection to a system operator for sending to said gift recipient; and
- receiving, by the service operator, the proposed gift and sending the gift to said gift recipient.

* * * * *